Figure 1:
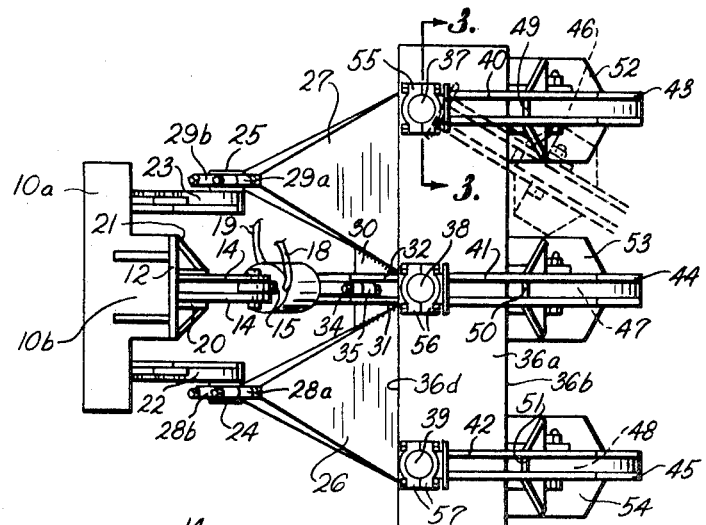

United States Patent

[11] 3,584,692

| [72] | Inventor | Clyde A. Fasse |
| --- | --- | --- |
| | | Box 247, Riley, Kans. 66531 |
| [21] | Appl. No. | 779,812 |
| [22] | Filed | Nov. 29, 1968 |
| [45] | Patented | June 15, 1971 |

[54] DIRT RIPPER
1 Claim, 3 Drawing Figs.

[52] U.S. Cl. .................................................. 172/449,
37/193, 172/450, 172/488, 172/699
[51] Int. Cl. ...................................................... A01b 13/08
[50] Field of Search ........................................... 172/439,
449, 450, 451, 464, 485, 488, 491, 668, 684, 689,
691, 692, 693, 694, 699, 748; 37/193; 308/19

[56] References Cited
UNITED STATES PATENTS

| 2,557,637 | 6/1951 | Danuser | 172/439 UX |
| --- | --- | --- | --- |
| 2,601,640 | 6/1952 | Simmons | 172/451 X |
| 2,666,376 | 1/1954 | Pursche | 172/439 X |
| 2,935,145 | 5/1960 | DuShane et al | 172/450 X |
| 2,998,965 | 9/1961 | Larson | 172/677 |

*Primary Examiner*—Robert E. Pulfrey
*Assistant Examiner*—C. Coughenour
*Attorney*—Scofield, Kokjer, Scofield and Lowe

ABSTRACT: A ripper construction of the type designed to pull teeth through hard soil or mixtures of soil and rock, the teeth each pivotably mounted on a box beam by means of ball and socket joints on top of and below the beam, the beam itself mounted on a tractor frame, the sides thereof, by another pair of ball and socket joints.

PATENTED JUN 15 1971

3,584,692

INVENTOR
Clyde A. Fasse

BY
Scofield, Kokjer, Scofield & Lowe
ATTORNEYS

DIRT RIPPER

BACKGROUND OF THE INVENTION

A ripper construction is a device designed to pull a tooth or several teeth through hard soil, soft rock, or mixtures of soil and rock. Generally speaking, a ripper designed for rock gouging or tearing will involve a rigid beam and a single, relatively rigid tooth, as very considerable force is required to drag this tooth through a soft rock formation and all of the weight of the tractor. Hydraulic means are conventionally provided to lift the tooth, which is generally mounted on a beam, into and out of catching engagement with the earth.

The rippers designed more for conservation-type purposes may utilize a plurality of teeth where hard soil alone is desired to be ripped up or hard soil with only occasional rock presence. The prior art is cognizant of both plural tooth rippers (Scott U.S. Pat. No. 1,136,172, issued Apr. 20, 1915 "Sub-Soil Plow") and single-tooth ripper (Larson U.S. Pat. No. 2,998,965 "Push Block for Tractor Mounted Ripper" issued Sept. 5, 1961 and Peveler et al. U.S. Pat. No. 3,120,281 issued Feb. 4, 1964 for "Adjustable Ripper Shank"). It is well known to mount pivotable teeth on a ripper box beam or beams by pin or bolt and nut arrangement and further to mount the beam carrying arm by a pin pivotably on the tractor frame.

DESCRIPTION OF THE INVENTION

A ripper attachment designed for conservation-type purposes where hard soil is to be ripped up with only occasional rock presence. The ripping assembly includes a box beam which carries a plurality of teeth pivotably mounted thereon by means of a ball and socket joint on top of the beam and a ball and socket joint on the under side of the beam. The beam itself is connected to the sides of a rearwardly extending tractor frame by a pair of forwardly extending arms, each arm connecting to the frame by another ball and socket joint.

An object of the invention is to provide an improved connection for the teeth of rippers designed for conservation-type purposes and their carrying beam, comprising the use of a pair of ball socket bearings one above and one below the said carrying beam.

Another object of the invention is to provide mounting means for a plurality of pivotable teeth on a dirt ripper carrying beam, which mounting means permit the engaging of the teeth in the ground, loosening of the connection between the teeth and the beam and thereafter the driving off of the tractor leaving the teeth set in the ground at the proper angle for reconnection with the carrying beam at a later time.

Another object of the invention is to provide a mounting means for the connecting beams to a ripper tooth carrying beam in a dirt ripper which means comprise a pair of ball sockets, one provided on each side of a tractor frame.

Another object of the invention is to provide a mounting means for a dirt ripper tooth assembly including the ripper teeth, the tooth-carrying beam and the tractor-connecting beams wherein the entire assembly may be disconnected from the tractor by embedding the teeth in the ground, removing the bearing halves of the ball socket joints connecting the connecting beams and the tractor frame and moving the tractor away, leaving the tooth assembly in the dirt to be simply and easily connected with the tractor at a future time.

Another object of the invention is to provide improvements in dirt rippers in the connection of the plurality of swivelable ripper teeth to a tooth-carrying beam wherein in the use of the ripper there is no particular friction on the bottom of the tooth-carrying beam and it is not required to put a wear plate on the bottom of the said tooth-carrying beam.

Another object of the invention is to provide improved ball socket for both the teeth on the tooth-carrying beam of the dirt ripper and the connection beams from the tooth-carrying beam to the tractor wherein the solid ball connection either to the tooth carrying beam or the tractor frame may be cut out and rewelded after being rotated a certain number of degrees whereby to give a completely new and usable bearing surface without requiring replacement of the ball of the ball socket.

Other and further objects of the invention will appear in the course of the following description.

In the drawing, which forms a part of the instant specification and is to be read in conjunction therewith, an embodiment of the invention is shown and, in the various views, like numerals are employed to indicate like parts.

FIG. 1 is a top plan view of the rear end of a tractor showing a mounting frame thereon and attached thereto for operation therewith, the subject improved dirt ripper assembly.

Figure 2:
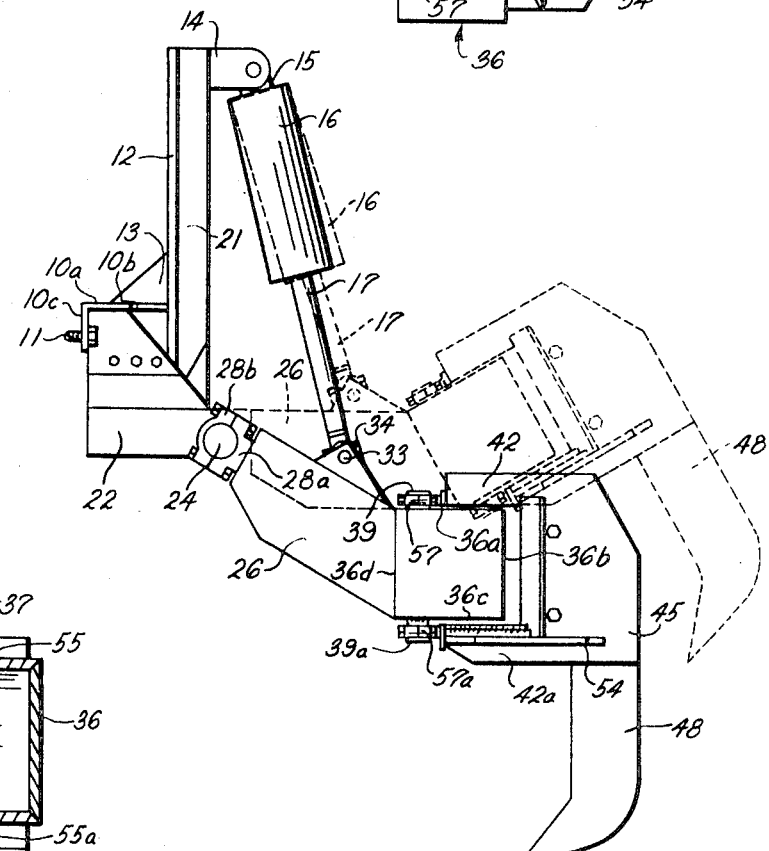

FIG. 2, in full lines, is a side view of the assembly of FIG. 1, with a dotted line showing of the ripper assembly in raised position.

Figure 3:
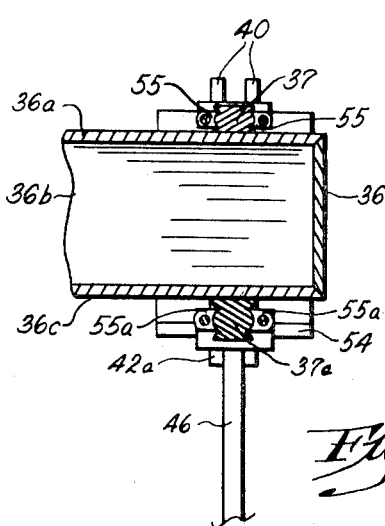

FIG. 3 is a view taken along the line 3-3 of FIG. 1 in the direction of the arrows.

Referring to the drawings, to the left in FIG. 1 and 2 is shown a typical tractor-mounting attachment or frame. This includes a horizontal angle iron having a top flange 10a with an elongate rearward central extension 10b and a vertical flange 10c. Flange 10c is connected to the tractor body by bolts 11. A vertical post 12 is connected to flange 10b by welding or the like and braces 13 thereon and has plates 14 at the upper end thereof adapted to receive the mounting flange 15 of hydraulic cylinder 16 which is pivotably pinned thereto. Hydraulic cylinder has piston arm 17 extending downwardly therefrom. The conventional hydraulic connections are schematically indicated in FIG. 1 at 18 and 19. The rearward portion of post 12 which receives the plates 14 therebetween comprise vertical members 20 to which arms 14 are welded or otherwise fixedly attached and angled vertical members 21 which connect to members 20 at their rearward ends and to post 12 at their forward ends. Fixed to the under side of flange 10a and to the rearward face of flange of 10c are rearwardly extending braced plates generally designated as 22 and 23. Connected to the rearward outward ends of said plates 22 and 23 are the balls 24 and 25 of ball and socket joints to be described.

A pair of rearwardly extending diverging beams 26 and 27 mount at their forward end the rearward halves of the paired bearings which fit around the ball 24 and 25. These bearing halves are designated 28a and 28b for the set seen in FIG. 2 and the lower portion of FIG. 1 and 29a and 29b for that set seen in the upper portion of FIG. 1. A plate 30 is welded at the rearward central portions of beams 26 and 27 to receive a pair of upwardly extending parallel plates 31 and 32, between which is mounted a ball member 33. The lower end of piston arm 17 is fitted with a bearing half 34 to which a bearing half 35 is coupled to pivotally connect the arm 17 to the ball member 33.

Welded or otherwise fixedly attached to the rear ends of beams 26 and 27 is an elongate hollow box beam generally designated 36 and having an upper face 36a a rearward face 36b, an underface 36c and a forward face 36d to which the beams are attached. Welded or otherwise fixedly attached adjacent the forward edge of top face 36a of beam 36 are a plurality of balls 37, 38 and 39 here three in number. Directly below each of these balls 37—39, inclusive on the underside of the beam on face 36c, there are welded or otherwise fixedly attached a plurality of like balls 37a—39a, inclusive, only one of which, 39a, may be seen in FIGS. 2 and 3.

A plurality of pivotable ripper teeth are mounted on the balls 37—39, inclusive and 37a—39a, inclusive by means of forwardly extending arms 40—42, inclusive on the upper face of the beam or above same, and 40a—42a therebelow. Only arms 42a are seen in FIGS. 2 and 3. Vertically extending rearward flanges 43—45, inclusive connect the flanges 42—42a, etc. At the lower end of the rearward vertical flanges 43—45, inclusive there are fixed ripper teeth 46—48, inclusive only tooth 48 being seen in FIGS. 2 and 3. Fixed to the front face of the vertical rearward flanges or plates 43—45 are beam abutment plates 49—51, inclusive which angle rearwardly on each side of center whereby to provide a flat face against which the beam 36 rear face 36b may have pivoted a certain number of degrees as may be seen in dotted lines in FIG. 1. As previously noted, balls 37—39, inclusive are preferably positioned as far forwardly as possible on the faces 36a and 36b of box beam 36 and there must be sufficient clearance between the rear face 36b of the box beam 36 and the plates 49—51, inclusive to permit the pivoting shown in FIG. 1 in dotted lines. A plurality of flat horizontal plates 52, 53 and 54 are provided welded to arms 40a—42a, inclusive intermediate the height thereof, but below the box beam to avoid dirt piling up into the space between the box beam and the plates 49—51, inclusive and jamming the pivoting of the rippers. This also protects the ball sockets to some degree.

The balls 37—39, inclusive are engaged by paired bearings 55—57 and 55a—57a, inclusive as seen in the various views with bolts and nuts connecting the bearings around the balls to make for the pivotable action seen in FIG. 1 in full in dotted lines. FIG. 3 shows the balls 39 and 39a pivotably engaged by the bearing halves.

In operation, it is assumed that the beams 26 and 27 are pivotably connected to the balls 24 and 25 by the bearing halves or sockets 28a and 28b and 29a and 29b respectively. Further, the piston arm 17 of the hydraulic cylinder 16 is connected by ball 33 and sockets or bearing halves 34 and 35 to plates 31 and 32 which are fixedly attached to plate 30, also welded to beams 26 and 27. The teeth 46—48, inclusive are pivotably mounted on the box beam upper and lower surfaces 36a and 36c by the balls 37—39, inclusive and 37a—39a, inclusive being embraced and pivotably engaged by the bearing halves or sockets 55—57, inclusive and 55a—57a, inclusive. When the piston arm 17 is in its upper position as seen in dotted lines in FIG. 2, the teeth 46—48, inclusive are drawn free of the earth's surfaces and the tractor may move forwardly without engaging the dirt or rock over which it is moving. When the piston arm is extended from the hydraulic piston by fluid flowing through lines 18 and 19, the teeth are lowered as is seen in FIG. 2 in full lines whereby the lower face 36c of the box beam is parallel to the earth's surface and the tooth is sunk essentially its whole length into the ground. As the tractor moves forward, the teeth may wiggle or pivot around the axes of attachment as seen in dotted lines and full lines in FIG. 1, at the top. If it is desired to remove the teeth 46—48 from the box beam for cleaning or repair to any part of the teeth, the beam, the beams 26—27 or the hydraulic means, the teeth may be sunk into the ground, the bearing halves or sockets 55—57, inclusive or 55a—57a, inclusive detached from one another by screwing off the nuts and bolts engaging same and the teeth left engaged in the ground as the tractor moves off, pulling the box beam from between them. (Or rather from between the upper arms 40—42, inclusive and 40a—42a, inclusive therebelow).

Alternatively, on the other hand, if it is desired to disconnect the entire assembly from the tractor frame, only three ball socket unions need be disconnected, namely, those at balls 24 and 25 and 33. This disconnects the hydraulic arms 17 and the tractor connections 28a and 28b and 29a and 29b. Again, the teeth may be left embedded in the ground with the entire assembly detachable from the tractor in this way. The tractor may be backed back into engagement with these connections and a reconnection made easily as the position of the relative parts are maintained with respect to one another. The same is true with respect to the teeth and the box beam.

The ball sockets employed on the tractor mounting frame at 24 and 25 are preferably larger in size than the tooth mounting ball sockets. This makes the ripper bar very simple to mount or disconnect for various types of work with the tractor and drawbar.

A contrast here is made between a pin and bolt mounting which would go through a box beam and engage bearings, or, in the case of the tractor mounting, go through the tractor mounting frame and engage bearings on either side thereof. In order to remove any one of the ripping teeth from the box beam, if same were pin mounted, one would have to pull the whole pin through the bearings in the box beam. Otherwise, to remove the beam mounted on the tractor frame, one would have to pull a pin or bolt out of a socket and bearings on each side of the tractor mounting. Again, if one had a pin mounting at 33 one would have to unthread a bolt and pull it through a bearing on the arm 17 and the plates 31 and 32. Here, using the ball and socket mountings, one merely removes the nuts at the top and the bottom bearings to remove a tooth and pulls the tooth off. Otherwise, to remove beams 26 and 27 from the tractor, he merely removes the bolts at the balls 24 and 25 and slips the bearings off the socket.

In use, when the teeth shown hit rocks in the soil, they weave around them. Otherwise, there would be very uneven loads on the sides of the tractor. A particular advantage with the ball socket is that there is no friction on the bottom of the beam and it is not required to put a wear plate on the bottom of the beam. With a pin, once the tooth goes into the ground, it jams the bottom of the under arm up against the beam and requires a wear plate. Further, in the stress of use of pins through upper and lower plates of a box beam as shown, there is a tendency to bow the upper and lower plates. Thus it is seen that applicant has provided three connections for a ripper assembly with a minimum friction in use at each of the points and without requirement of wear plates and with requirement of considerably less maintenance.

A round weld is very strong. After the balls shown have worn considerably, they can be turned 45° by cutting out and rewelding thus getting a new bearing surface. Any number of teeth can be employed. Here the ripping device is shown short coupled to minimize wear on the tractor. It is totally accessible and permits the use of the tractor in multiple purposes. Once the teeth are set in the ground the bolts on the front balls and the hydraulic arm ball can be loosened and the tractor driven off. Then, the driver can line up and back into the device to obtain automatic coupling which requires less labor and help.

I claim:

1. A tractor-mounted dirt ripper comprising:
   an elongate beam member having upper and lower surfaces;
   mounting members rigidly connected to said beam member and pivotally connected to said tractor;
   hydraulic piston means connected to said tractor and to said beam member to pivotally raise and lower said beam member;
   a ripping tooth having a C-shaped mounting yoke with upper and lower arms extending respectfully above and below the upper and lower surfaces of said beam member;
   a first ball mounted on the upper surface of said beam member, and a second ball mounted to the lower surface of said beam member;
   a first half socket attached to the end of the upper arm of said yoke, and a second half socket attached to the end of the lower arm of said yoke; and
   a first half socket cap removably coupled to said first half socket to bearingly engage said first ball, and a second half socket cap removably coupled to said second half socket to bearingly engage said second ball, whereby said ripping tooth is pivotally and supportingly carried on said beam member.